United States Patent [19]

Miyake

[11] 4,318,600
[45] Mar. 9, 1982

[54] PROGRAMMED SHUTTER CONTROL CIRCUIT

[75] Inventor: Toshihide Miyake, Kashihara, Japan

[73] Assignee: Sharp Kabushiki Kaisha, Osaka, Japan

[21] Appl. No.: 231,853

[22] Filed: Feb. 5, 1981

[30] Foreign Application Priority Data

Feb. 5, 1980 [JP] Japan ................... 55-14637

[51] Int. Cl.³ ............................... G03B 7/08
[52] U.S. Cl. ........................ 354/51; 354/24; 354/50; 354/60 R
[58] Field of Search ............ 354/24, 50, 51, 60 R

[56] References Cited

U.S. PATENT DOCUMENTS

| | | | |
|---|---|---|---|
| 3,731,603 | 5/1973 | Ono et al. | 354/24 |
| 3,866,240 | 2/1975 | Tsujimoto | 354/24 |
| 4,032,801 | 6/1977 | Fulkerson | 354/24 |
| 4,099,188 | 7/1978 | Uno et al. | 354/24 |
| 4,112,441 | 9/1978 | Kawasaki | 354/24 |
| 4,181,413 | 1/1980 | Kawasaki | 354/50 |
| 4,264,163 | 4/1981 | Hickok et al. | 354/51 |
| 4,269,490 | 5/1981 | Takami | 354/50 |

FOREIGN PATENT DOCUMENTS 2018302  7/1973  Fed. Rep. of Germany ........ 354/24

Primary Examiner—Russell E. Adams
Attorney, Agent, or Firm—Birch, Stewart, Kolasch & Birch

[57] ABSTRACT

An electronic shutter control circuit comprises a photoconductive material producing a signal to be applied to the first transistor, a second transistor having a base connected to its collector, the second transistor being serially connected to the first transistor, a third having a base transistor connected to the collector of the first transistor having a base, a fourth transistor connected to its collector, the fourth transistor being serially coupled to the third transistor, a current supplier circuit connected to the fourth transistor, a capacitor serially coupled to the third transistor, and a comparison circuit connected to the capacitor for detecting a charge amount condensed by the capacitor and for providing shutter operation signals used for operation of a shutter mechanism.

5 Claims, 5 Drawing Figures

PROGRAMMED SHUTTER CONTROL CIRCUIT

BACKGROUND OF THE INVENTION

The present invention relates to a shutter control circuit used for cameras and more particularly to such a shutter circuit for cutting off a beam of light by opening and closing a shutter at different rates of speed to expose film in response to photo current developed by a photo sensitive element such as CdS.

One recent programed shutter mechanism including blades functions as an iris where, before release of a shutter switch, the blades completely close an aperture of a camera and, after release, the iris is opened to control the amount of light reaching the film of the camera. Before the iris is completely opened, there is a delay of about 0 to 60 msec.

FIG. 1 shows a graph representing relationship between area (S) of an opened aperture by the shutter blades and time passage (T). The shutter blades are completely opened after time passage $T_O$. If a rapid shutter speed is set in the camera, the shutter becomes closed prior to complete opening by the iris. If a slow shutter speed is set in the camera, the shutter becomes closed after the iris has been completely open. Refer to condition a in FIG. 1 in which a rapid shutter speed is set, condition b in which a medium shutter speed is set, and c condition in which a slow shutter speed is set.

As is apparent from the graph of FIG. 1, the values of the areas S continue to increase prior to a time $T_O$ while the values of the areas S are kept constant after the time $T_O$.

Therefore, it is necessary to utilize different ways to obtain an appropriate amount of exposure depending on whether time a is necessary before or after the time $T_O$. Suitable careful attention is not directed to the above described characteristics of the exposure by the iris diaphragm in the conventional shutter mechanism.

SUMMARY OF THE INVENTION

Accordingly, it is an object of the present invention to provide an improved shutter control circuit eliminating the above described problems.

It is another object of the present invention to provide an improved shutter control circuit for accomplishing accurate magnitude control of the cross section of a beam light passing through a shutter diaphragm.

Briefly described, an electronic shutter control circuit of the present invention comprises a photoconductive material, a first transistor having a base connected to its collector, the photo output current produced by the photoconductive material being applied to the first transistor, a second transistor having a base connected to its collector, the second transistor being serially connected to the first transistor, a third transistor having a base connected to the collector of the first transistor, a fourth transistor having a base connected to its collector, the fourth transistor being serially coupled to the third transistor, a current supplier circuit connected to the fourth transistor, a capacitor serially coupled to the third transistor, and a comparison circuit connected to the capacitor for detecting a charge amount condensed by the capacitor and for providing shutter operation signals used for operation of a shutter mechanism.

BRIEF DESCRIPTION OF THE INVENTION

The present invention will be better understood from the detailed description given hereinbelow and the accompanying drawings which are given by way of illustration only, and thus are not limitative of the present invention and wherein.

DESCRIPTION OF THE INVENTION

Figure 1:
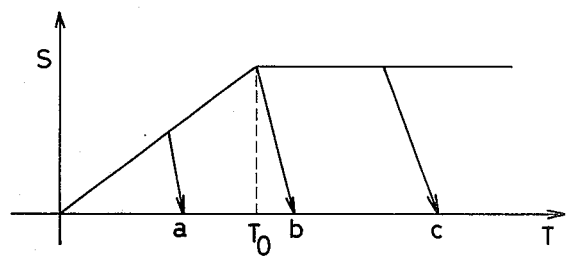
FIG. 1 is a graph representing relationship betweeen areas of an opened aperture and time passage.

First of all, a principle used in connection with the present invention will be described. A photoconductive material for detecting incident radiation is preferably made of any semiconductor material such as CdS.

Magnitude control of the cross section of a beam light passing through a shutter diaphragm is effected by detecting output current in response to the incident radiation applied to the CdS photo cell. It is desirable that correction be enabled by forming shutter operation control signals in response to the output current in order to harmonize therein with the opening characteristics of the iris diaphragm, thereby compensating for deviations in the opening characteristics.

It is to be noted that forming a shutter operation control signal for compensating for the deviations in the opening characteristics is carried out by controlling value $\gamma$ of the CdS photo cell. The value $\gamma$ is defined to be a value as follows:

$$\gamma \text{ value} = \frac{l_n R}{l_n L}$$

where
R: variations of the resistance of the CdS photo cell radiated by the incident radiation
L: the amount of the incident radiation
$l_n$ R and $l_n$ L: each of values obtained by natural logarithm The values of the $\gamma$ value should be such that slopes of asymptotes for the values of the value are changed with a critical separation in connection with a predetermined level of the incident radiation in order to compensate for the deviations as described below.

With the assumption that $T_O$ represents a time passage from complete closure of the iris diaphragm to complete opening, K/T represents areas of the iris aperture, L indicates strength in the incident light, and T indicates a time passage for exposure, an amount of exposure indicated by E is formulated as follows by neglecting a time passage used for the shutter to close.

$$\text{When } T \leq T_0, E = K_2 \frac{1}{2} K_1 T^2 L \qquad (1)$$

$$\text{When } T > T_0, E = K_2 \left[ \frac{1}{2} K_1 T_0^2 + K_1 T_0 (T - T_0) \right] L \qquad (2)$$

$K_2$ = constant

When $R_{CdS}$ indicates an effective value of the resistance of the CdS cell required to receive the incident radiation L, a relationship of $R_{CdS} \propto T$ is obtained because $R_{CdS}$ forms an integration time constant in combination with an integration capacitor. Then, under the condition of $T=K_3R_{CdS}(T_O=K_3R_O)$, equation (1) can be reformed as:

$$E = \frac{1}{2} K_1K_2K_3{}^2 R_{CdS}^2 L$$

That is, $\dfrac{1}{R_{CdS}^2} = \dfrac{K_1K_2K_3{}^2}{2E}$

E can be considered to be a constant so that $K_1K_2K_3{}^2/2E$ can be replaced by $K_4$ (constant).

Therefore, $\dfrac{1}{R_{CdS}} = \sqrt{K_4L}$ $T \leq T_0$ means $L \geq \dfrac{1}{K_4R_0{}^2}$.

$K_4R_O{}^2L$ is replaced by $L'$.
Therefore, when $$L' \geq 1, \frac{1}{R_{CdS}} = \frac{1}{R_0} \sqrt{L'} \quad (3)$$

In the same manner, equation (2) leads to the following:

$$\frac{1}{R_{CdS}} = \frac{2K_4R_0L}{1 + K_4R_0{}^2L}$$

Therefore, when $$L' < 1, \frac{1}{R_{CdS}} = \frac{2L'}{R_0(1 + L')} \quad (4)$$

Equations (3) and (4) indicate that the $\gamma$ value of the CdS photo cell is preferably 0.5 when $L' \geq 1$ and the same is subsequently near to 1 when $L' < 1$.

With the foregoing, a shutter control circuit of the present invention supplies the different characteristics of the $\gamma$ value of the CdS photo cell as represented by equations (3) and (4) by using the same CdS photo cell according to its circuit operation. As a preferred embodiment of the present invention, the CdS cell having its $\gamma$ value of about 0.5 is used to provide the different characteristics by about 0.5 and about 1 by switching dependent on the level of the incident light.

Figure 2:
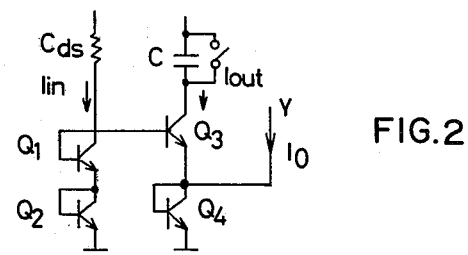
FIG. 2 shows a circuit according to the present invention.

Now referring to FIG. 2, a fundamental circuit of the present invention comprises four transistors $Q_1$ to $Q_4$, a CdS photo cell having the $\gamma$ value of about 0.5, and a capacitance C. The photo cell is serially coupled to the transistor $Q_1$ for generating a photo output current $I_{in}$ in response to the incident radiation. These photo output signals $I_{in}$ are applied to the transistor $Q_1$. Each of the bases of the transistors $Q_1$ and $Q_2$ is connected to each of the collectors so that these transistors are serially coupled to each other. The collector of the transistor $Q_1$ is linked to the base of the transistor $Q_3$. The emitter of the transistor $Q_3$ is connected to the collector of the transistor $Q_4$ so that the two transistors $Q_3$ and $Q_4$ are serially coupled. The base of the transistor $Q_4$ is coupled to its collector. A constant current circuit Y is connected to the transistor $Q_4$ to provide a constant current $I_O$.

Each of currents applied to the transistors $Q_1$ to $Q_4$ is controlled by the input current $I_{in}$ as an output of the photo cell. However, since the capacitance C is serially connected to the transistor $Q_3$, charge becomes condensed by a current passing through the transistor $Q_3$. A voltage between the two terminals of the capacitor C is applied to one terminal of a conventional comparator while the other terminal of the comparator receives a prescribed reference voltage for comparison purposes. According to the result obtained, operation of the conventional shutter mechanism is controlled. Thus, the CdS photo cell having, the $\gamma$ value of about 0.5 is utilized.

Further, the same CdS photo cell is used to provide characteristics similar to those used another CdS photo cell having the $\gamma$ value of about 1 by the circuit of FIG. 2. This purpose is obtained by logarithm characteristics in "$I_c$-$V_{BE}$" of the transistors.

When a constant voltage is applied to the CdS cell having the $\gamma$ value of about 0.5, a photo output current $I_{in}$ is represented as follows:

$$I_{in} = K_5 \sqrt{L} \quad (5)$$

($K_5$ : constant)

$V_{BE}(Q_i)$ represents a voltage between the base and the emitter of any transistor $Q_i$. $I_C(Q_i)$ represents a collector current of the transistor $Q_i$. $I_B(Q_i)$ indicates a base current of the transistor $Q_i$. Since the transistors $Q_1$ and $Q_3$ are such that each of the bases is coupled to a common voltage, the following equation is maintained.

$$V_{BE}(Q_1)+V_{BE}(Q_2)=V_{BE}(Q_3)+V_{BE}(Q_4) \quad (6)$$

Since $V_{BE}(Q_i)$ is proportional to logarithm of $I_C(Q_i)$:

$$I_C(Q_1)I_C(Q_2)=(I_C(Q_3)I_C(Q_4)$$

An amount of the base current is much smaller than that of the collector current and can be neglected.

$$I_C(Q_1)=I_C(Q_2)=I_{in}$$

$$I_C(Q_3)=I_{out}$$

$$I_C(Q_4)=I_{out}+I_o$$

Therefore, $$I_{in}{}^2=I_{out}(I_{out}+I_o)$$

where $I_{out}$ represents an equivalent amount of output current by the CdS photo cell.

From equation (5), $$K_2{}^2L=I_{out}(I_{out}+I_o)$$

$I_{out}$ is set to be $K_6/R_{CdS}(ef)$ where $R_{CdS}(ef)$ is an effective resistance of the CdS photo cell from the view of the output terminals and $K_6$ is a constant.

Therefore, $K_5{}^2L = K_6 \dfrac{1}{R_{CdS}(ef)} \left( \dfrac{K_6}{R_{CdS}(ef)} + I_o \right)$ This is reformed as follows:

$$L'' = \frac{1}{R'_{CdS(ef)}} \left( \frac{1}{R'_{CdS(ef)}} + 1 \right) \quad (7)$$

-continued where $R_{CdS(ef)} = \dfrac{K_6}{I_o} R'_{CdS(ef)}$ $L = \dfrac{K_6 I_o}{K_5{}^2} L''$ When $\dfrac{1}{R'_{CdS(ef)}} \gg 1$, from equation (7)

$L'' = \dfrac{1}{R'_{CdS(ef)}{}^2}$

This means $\gamma = 0.5$.

When $\dfrac{1}{R'_{CdS(ef)}} \ll 1$, from equation (7), $L'' = \dfrac{1}{R'_{CdS(ef)}}$ This means $\gamma = 1$.

This indicates that strong incident radiation and weak incident radiation both provide suitable control. In the circuit of FIG. 2, the voltage of both terminals of the CdS photo cell is maintained to be constant so that thermal characteristics of this circuit do not influence the CdS cell.

Figure 3:
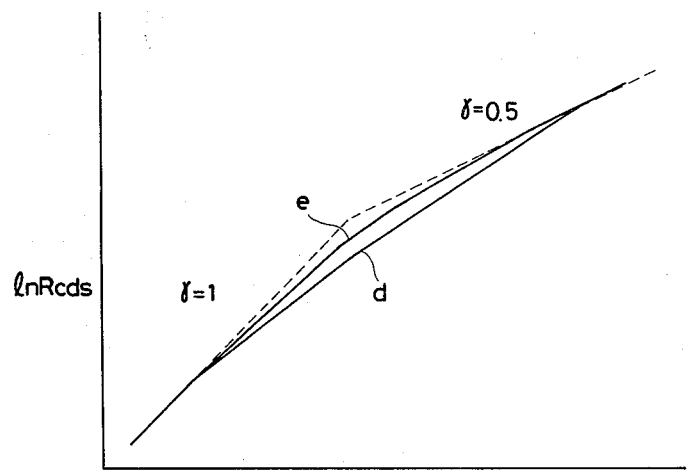
FIG. 3 is a graph representing relationship between incident radiation and a value of a CdS semiconductor resistor.

FIG. 3 shows a graph representing a relation between logarithm of a resistance of the CdS photo cell as a vertical axis and logarithm of strength of an incident radiation as a horizontal axis. Data d indicate the characteristics by the circuit of FIG. 2. Two asymptotes, denoted by dotted line, of r=1 and r=0.5 deviate from the data d at the center while they agree with the data d at the two sides. It is most preferable that other data e should be obtained. The deviation with the data d results in error operations. Data nearer to the data e than the data d by the circuit of FIG. 2 are obtained by other circuits of the present invention as described below.

Figure 4:
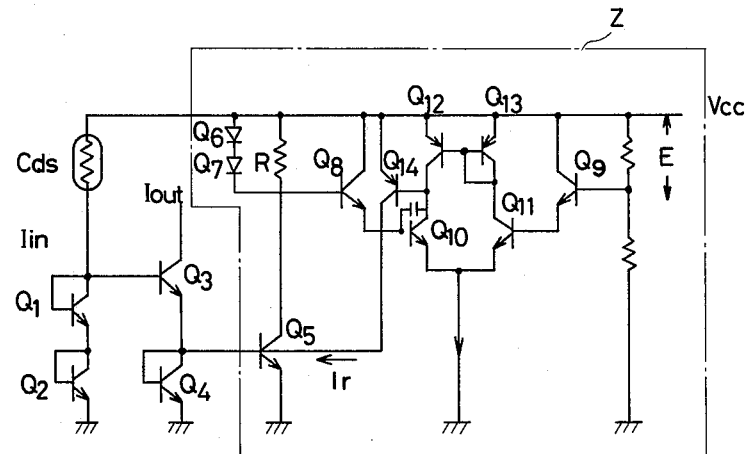
FIGS. 4 and 5 are circuit configurations of other circuits of the present invention.

FIG. 4 shows another circuit comprising transistors $Q_1$ to $Q_5$ and $Q_8$ to $Q_{14}$, diodes $Q_6$ and $Q_7$, the CdS photo cell, and a resistor R. The CdS photo cell has the $\gamma$ value of about 0.5. In this circuit, a feedback circuit Z is provided for supplying a feedback current $I_r$ applied to the transistor $Q_4$. This feedback current $I_r$ functions to achieve the following equations when the current $I_o$ is constant.

When $I_{out} > I_o$, $I_r = 0$

When $I_{out} \leq I_o$, $I_r + I_{out} = I_o$

The feedback circuit Z comprises a differential amplifier formed by the transistors $Q_{10}$ through $Q_{13}$, and a circuit for providing a reference voltage E and an input voltage C. The collector of the transistor $Q_{14}$ is tied to the base of the transistor $Q_5$ and further to the collector of the transistor $Q_4$.

The circuit arrangement of FIG. 4 provides the relation of $I_C(Q_4) = I_C(Q_5)$. When $I_C(Q_4)$ is smaller than a constant current $I_o(=E/R)$, the voltage of the base of the transistor $Q_8$ is set to be higher than that of the base of the transistor $Q_9$. The transistor $Q_{14}$ generates the current $I_r$ which causes an increase in the collector current $I_C(Q_5)$ of the transistor $Q_5$, so that a feedback is enabled to establish $I_C(Q_5) = I_o$.

When $I_o < I_{in}$, $I_C(Q_5)$ becomes more than $I_o$, the feedback circuit Z is placed in off state. In order to prevent the saturation of the transistor $Q_5$ in the cut-off state of the feedback circuit Z, the two diodes $Q_6$ and $Q_7$ are connected at the input side of the differential amplifier.

The operation of the circuit of FIG. 4 is conducted as follows:

When $I_{in} > I_o$, $I_{in}{}^2 = I_{out}{}^2$

Therefore, $I_{in} = I_{out}$

When $I_{in} \leq I_o$, $I_{in}{}^2 = I_{out} I_o$

This is the same as the asymptotes of FIG. 3, denoted by the dotted lines.

However, further approach to the data e is expected by the control when the current to the transistor $Q_4$ is cut off above a predetermined level of the incident radiation as in the case of the circuit of FIG. 4 and, in addition, when a constant current is applied to the transistor $Q_4$ from the external side as in the case of the circuit of FIG. 2.

Figure 5:
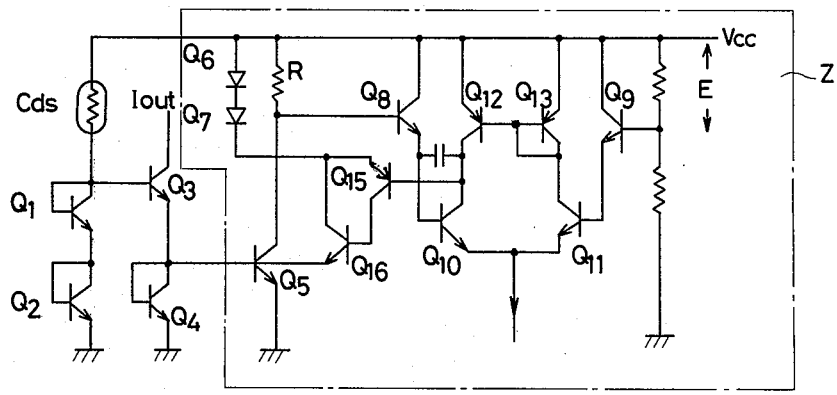

FIG. 5 shows a further circuit of the present invention for this purpose. This circuit mainly comprises transistors $Q_1$ to $Q_5$, $Q_8$ to $Q_{13}$, and $Q_{15}$ to $Q_{16}$, diodes $Q_6$ and $Q_7$, the CdS photo cell. Another type of feedback circuit Z is provided comprising the differential amplifier. This feedback circuit is different from that of FIG. 4 in that, at the output side of the differential amplifier, the transistor $Q_{14}$ connected to the transistor $Q_5$ is replaced by two transistors $Q_{15}$ and $Q_{16}$ connected to the transistor $Q_5$. The emitter region of the transistor $Q_5$ has an area of n times as large as that of the transistor $Q_4$.

This circuit arrangement of FIG. 5 provides the following control when $E/R = 2I_o$ is supposed.

When $$n I_{out} \leq 2 I_o, I_{in}{}^2 = I_{out} I_C(Q_4) \qquad (8)$$

The resistor R serially connected to the transistor $Q_5$ flows a current of $I_C(Q_5) + I_C(Q_6)$.

$I_C(Q_5) = n I_C(Q_4)$ $I_C(Q_6) + I_{out} = I_C(Q_4)$

Therefore, $I_C(Q_5) + I_C(Q_6) = (n+1) I_C(Q_4) - I_{out}$

The feedback is effected so that the above equation should be $2I_o$.

Thus, $(n+1) I_C(Q_4) - I_{out} = 2 I_o \qquad (9)$

From equations (8) and (9), $$I_{out} = \sqrt{(n+1) I_{in}{}^2 + I_o{}^2} - I_o \qquad (10)$$

When $n I_{out} > E/R$, the feedback circuit is cut off. Then, $$I_{out} = I_{in} \qquad (11)$$

A large amount of n provides the circuit of FIG. 5 similar to that of FIG. 4 while a small amount of n provides the circuit of FIG. 5 similar to that of FIG. 2. The data e, which is most preferable, is obtained by the circuit of FIG. 5 in the case of n=2 according to equation (10).

While only certain embodiments of the present invention have been described, it will be apparent to those skilled in the art that various changes and modifications may be made therein without departing from the spirit and scope of the invention as claimed.

What is claimed is:

1. An electronic shutter control circuit comprising:
   a photoconductive material having a $\gamma$ value;
   a first transistor having its base connected to its collector, a photo output current produced by said photoconductive material being applied to said first transistor;
   a second transistor having its base connected to its collector, said second transistor being serially connected to said first transistor;
   a third transistor having its base connected to the collector of said first transistor;
   a fourth transistor having its base connected to its collector, said fourth transistor being serially coupled to said third transistor;
   current supplier means connected to said fourth transistor for providing a current;
   capacitor means serially coupled to said third transistor for condensing charge; and
   means connected to said capacitor means for detecting a charge amount condensed by said capacitor and for providing shutter operation signals used for operation of a shutter mechanism.

2. The circuit of claim 1, wherein said current supplier means is a constant current supply circuit.

3. The circuit of claim 1, wherein said current supplier means is a feedback circuit.

4. The circuit of claim 1, wherein said photoconductive material comprises a CdS photo cell.

5. The circuit of claim 4, wherein said CdS photo cell has the $\gamma$ value of about 0.5.

* * * * *